United States Patent
Ross (10) Patent No.: US 8,265,914 B2
(45) Date of Patent: Sep. 11, 2012

(54) ADDING POSITIONAL INFORMATION FOR SURFACES IN A GEOLOGICAL FORMATION AFTER TRANSFORMING TO A GAPPED REPRESENTATION

(75) Inventor: William C. Ross, Littleton, CO (US)

(73) Assignee: Landmark Graphics Corporation, Houston, TX (US)

( * ) Notice: Subject to any disclaimer, the term of this patent is extended or adjusted under 35 U.S.C. 154(b) by 1072 days.

(21) Appl. No.: 12/186,225

(22) Filed: Aug. 5, 2008

(65) Prior Publication Data

US 2009/0063117 A1   Mar. 5, 2009

Related U.S. Application Data

(60) Provisional application No. 60/969,860, filed on Sep. 4, 2007.

(51) Int. Cl.
 *G06G 7/48* (2006.01)
(52) U.S. Cl. .......................................................... 703/10
(58) Field of Classification Search ...................... 703/10
 See application file for complete search history.

(56) References Cited

U.S. PATENT DOCUMENTS

| | | | | | |
|---|---|---|---|---|---|
| 4,357,660 | A | * | 11/1982 | Hepp | 702/10 |
| 4,414,656 | A | * | 11/1983 | Hepp | 367/25 |
| 4,638,254 | A | * | 1/1987 | Uhri | 324/323 |
| 4,781,062 | A | * | 11/1988 | Taylor | 73/152.16 |
| 4,991,095 | A | | 2/1991 | Swanson | |
| 5,057,021 | A | * | 10/1991 | Delhomme | 434/430 |
| 5,363,299 | A | | 11/1994 | Hurley | |
| 6,012,017 | A | | 1/2000 | Van Bemmel et al. | |
| 2003/0023383 | A1 | | 1/2003 | Stark | |

OTHER PUBLICATIONS

"GeoGraphix SmartSECTION Technology"; Landmark Graphics Corporation; 2006; 4 pages.
"GeoGraphix Discovery Suite"; Landmark Graphics Corporation; 2006; 4 pages. Retrieved from Internet: http://www.geographix.com/public/geographix/contents/Data_Sheets/web/H04981.pdf.
Wheeler, Harry E.; "Time-Stratigraphy"; Bulletin of the American Association of Petroleum Geologists, vol. 42, No. 5 (May 1958); pp. 1047-1063.
International Search Report and Written Opinion for Application No. PCT/US2008/075144, mailed Sep. 23, 2010. 11 pages.

* cited by examiner

*Primary Examiner* — Kandasamy Thangavelu
*Assistant Examiner* — Nithya Janakiraman
(74) *Attorney, Agent, or Firm* — Meyertons Hood Kivlin Kowert & Goetzel, P.C.; Jeffrey C. Hood; Mark K. Brightwell (57) ABSTRACT

A system, method and memory medium for injecting positional information into a geological data set for improved modeling of surfaces in a geological formation. The method involves: (1) displaying a cross section of the formation through a selected subset of wells, where the displayed cross section includes well picks for the selected wells; (2) opening a gap in an unconformity of the displayed cross section, where the gap is opened at one or more wells that intersect the unconformity, where the gap represents non-deposition and/or material that is missing from the formation due to erosion; (3) receiving user input specifying positions of tops within the gap; and (4) closing the gap, where closing the gap includes calculating positions of restored tops based on the positions of the tops specified within the gap, where the positions of the restored tops are usable to model one or more surfaces in the formation.

21 Claims, 13 Drawing Sheets

ADDING POSITIONAL INFORMATION FOR SURFACES IN A GEOLOGICAL FORMATION AFTER TRANSFORMING TO A GAPPED REPRESENTATION

RELATED APPLICATION DATA

This application claims the benefit of U.S. Provisional Application No. 60/969,860, filed on Sep. 4, 2007, entitled "Injecting Points onto Surfaces of a Geological Formation for Improved Representation of those Surfaces by Surface Models", invented by William C. Ross. This provisional application is hereby incorporated by reference in its entirety.

FIELD OF THE INVENTION

The present invention generally relates to the field of interpretive earth modeling, and more particularly, to a system, method and memory medium for the injection of additional points onto surfaces of a geological formation.

DESCRIPTION OF THE RELATED ART

A geological formation includes a number of layers. The boundaries between the layers are referred to herein as surfaces. Wells may be drilled into the geological formation in order to gather information about the layers and the surfaces between them. In particular, samples of position on the surfaces may be determined. Because the drilling of wells is expensive, the number of surface sample points that can be gathered in a geological formation is limited. Thus, some of the surfaces may be not be sampled sufficiently densely to allow an accurate estimation of the surfaces.

Surfaces may be estimated with surface models. Some surfaces may be under-constrained, i.e., not constrained with a sufficient number of surface sample points to allow an accurate estimation of the surface. The surface sample points on a given surface may be interpreted as constraints on a modeling algorithm that attempts to estimate the surface with a model. The existing methods for handling the under-constrained surface problem (using isochore or isopach maps) are cumbersome.

An isochore map may be added to a given surface in order to extrapolate an under-constrained (e.g., partially missing or spatially limited) surface into a fault or unconformity. The extrapolated surface may then be the basis for the addition of another isochore map to extrapolate yet another surface into the fault or unconformity, and so on.

Figure 1A:
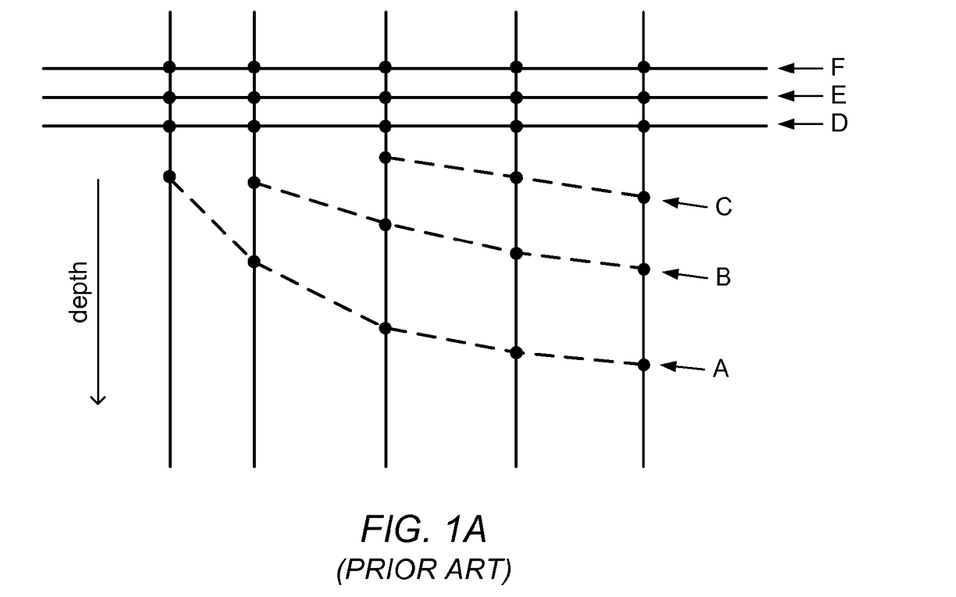
FIG. 1A illustrates a typical cross section of a geological formation with a limited collection of surface sample points.

In the initial stages of interpretation, some surfaces are well constrained (i.e., sampled by a sufficient number of surface sample points) and others are not. In FIG. 1A, surfaces A, D, E and F are each constrained with five surface sample points, whereas surface B and surface C are relatively under-sampled with four and three surface sample points respectively.

Figure 1B:
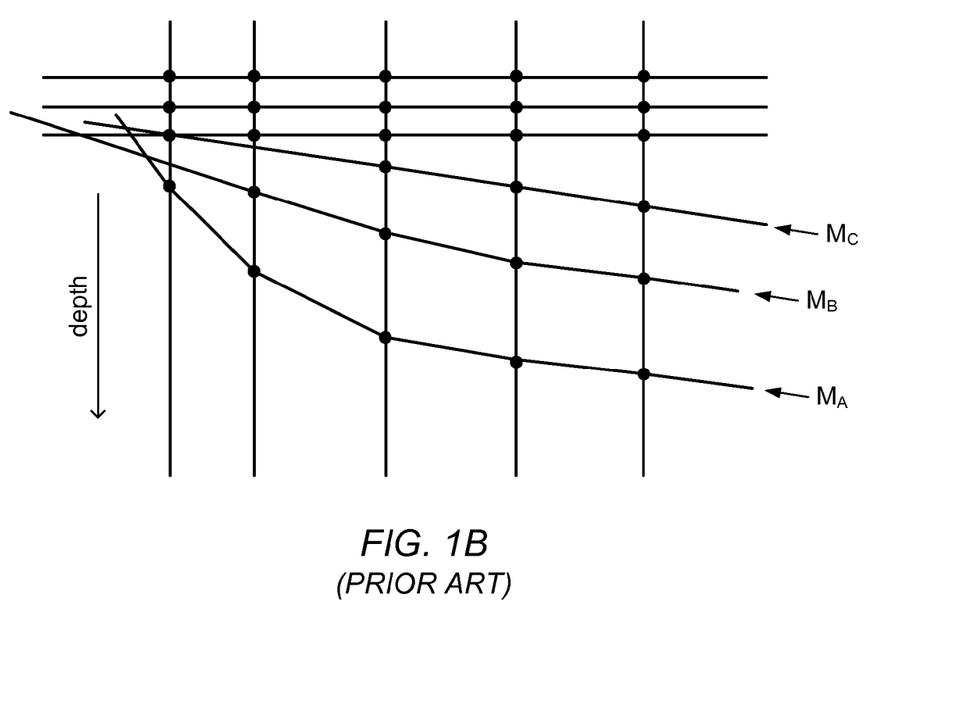
FIG. 1B illustrates naïve surfaces created from the limited surface sample points of FIG. 1A.

The modeling algorithm operates on the surface sample points for a given surface and creates a model for the surface. The quality of the surface model depends in part on the number of surface sample points for that surface as suggested in FIG. 1B. Models $M_A$, $M_B$ and $M_C$ approximate surfaces A, B and C respectively. Note that model $M_C$ poorly represents surface C. A consideration of the laws of geoscience would not suggest that surface C should be as flat as model $M_C$ suggests. Geoscience laws suggest that formation tops tend to parallel other surface tops. Therefore $M_C$ should be parallel to $M_A$.

Figure 1C:
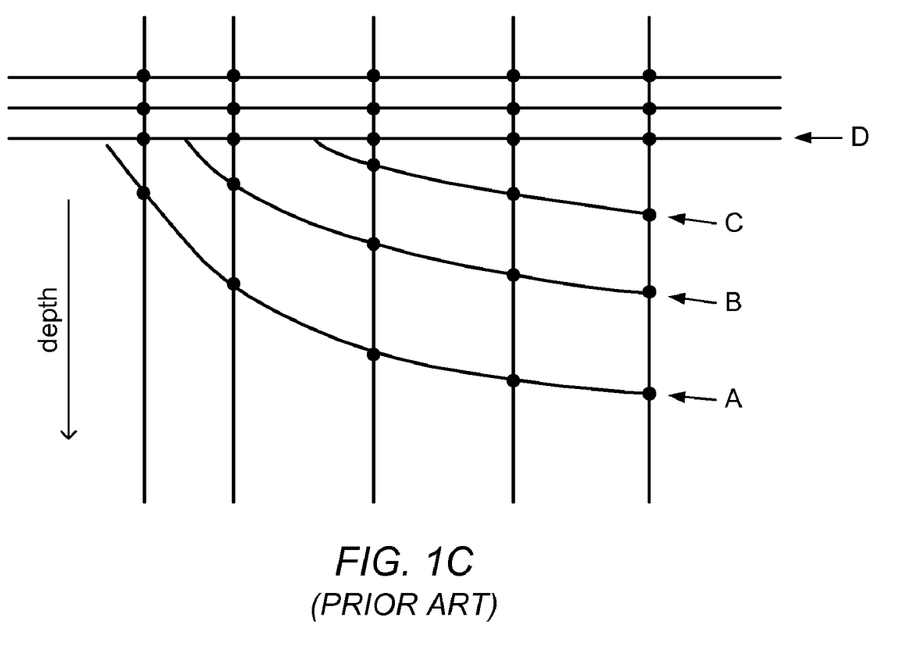
FIG. 1C illustrates the geologist's conception of how surfaces A, B and C should approach an upper unconformity surface (i.e., surface D) and truncate.

FIG. 1C represents the geologist's conception of how the surfaces should behave. In other words, the geologist looks at surface A as a guide and concludes that all the surfaces (i.e., surfaces A, B and C) are sub-parallel and are likely folded and truncated below the lowest sub-horizontal surface (i.e., surface D). The predominant method for effectively modeling surfaces B and C involves first building isopach (or isochore) maps between the most well-constrained surface (surface A) and the less well-constrained surfaces (surfaces B and C), and then successively adding these isopach maps starting from the most well-constrained surface. This method requires lots of manual bookkeeping, and, most significantly, requires that there be a well-constrained surface to use to constrain the less well-constrained surfaces. If such a surface does not exist there is no simple way to model the less well-constrained surfaces.

Thus, there exists a need for systems and methods that allow a user to generate surface models for surfaces with improved quality and/or efficiency, especially for surfaces that are under-constrained.

SUMMARY

In one set of embodiments, a computer-implemented method for enhancing the quality of modeling of surfaces in a geological formation may involve the following operations. First, a computer may receive user input selecting a subset S of wells from a collection of wells. Second, the computer may display a cross section of the geological formation through the wells of the subset S. The displayed cross section includes well picks for the wells of the subset S. Third, the computer may open a gap in an unconformity of the displayed cross section. The gap is opened at one or more wells of the subset S that intersect the unconformity. The gap represents non-deposition and/or material that is missing from the geological formation due to erosion. Fourth, the computer may receive user input specifying positions of tops within the gap. Fifth, the computer may close the gap in response to a user command. The action of closing the gap includes calculating positions of restored tops based on the positions of the tops specified within the gap. The positions of the restored tops are usable to model one or more surfaces in the geological formation. The computer may store the positions of the restored tops in a memory medium.

If there is more than one unconformity in the displayed cross section, this computer-implemented method may be repeated for any or all of the unconformities. Furthermore, this computer-implemented method may be repeated for any number of well subsets.

The computer may be programmed to operate on well picks corresponding to the collection of wells and on the restored top positions in order to determine one or more models for one or more surfaces in the geological formation. The computer may be able to do a better job at generating models that accurately estimate the formation surfaces since it has access to the extra information provided by the restored top positions.

The surface models may be used to estimate a location of a substance (i.e., an economically valuable substance) in the geological formation. In various embodiments, the estimated location may be used to control a drilling of a well, control the acquisition of seismic data, determine a policy for exploitation of the substance, etc.

The computer may display a visual representation of the geological formation including a representation of the one or more surface models.

In some embodiments, a computer-accessible memory medium is configured to store program instructions, where the program instructions are executable to implement any of the method embodiments described herein (or, any combination of the method embodiments described herein, or, any subset of any method embodiment described herein). A memory medium is a medium configured for the storage of information. Examples of memory media include various kinds of magnetic media (e.g., magnetic tape, magnetic disk, magnetic strips, and magnetic film); various kinds of optical media (e.g., CD-ROM); various kinds of semiconductor RAM and ROM; various media based on the storage of electrical charge and/or other physical quantities; etc.

In some embodiments, a computer system is configured to include a processor (or a set of processors) and memory medium. The memory medium is configured to store program instructions. The processor is configured to read and execute the program instructions. The program instructions are executable to implement any of the various method embodiments described herein (or, any combination of the method embodiments described herein, or, any subset of the method embodiments described herein). The computer system may be realized in any of various forms. For example, the computer system may be a personal computer (in any of its various forms), a workstation, a computer on a card, a server computer, a client computer, etc.

In some embodiments, a set of computers distributed through a network may be configured to partition the effort of executing a method (e.g., any of the method embodiments disclosed herein).

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. As used herein, the term "include" means "includes, but is not limited to".

DETAILED DESCRIPTION OF THE EMBODIMENTS

Figure 2:
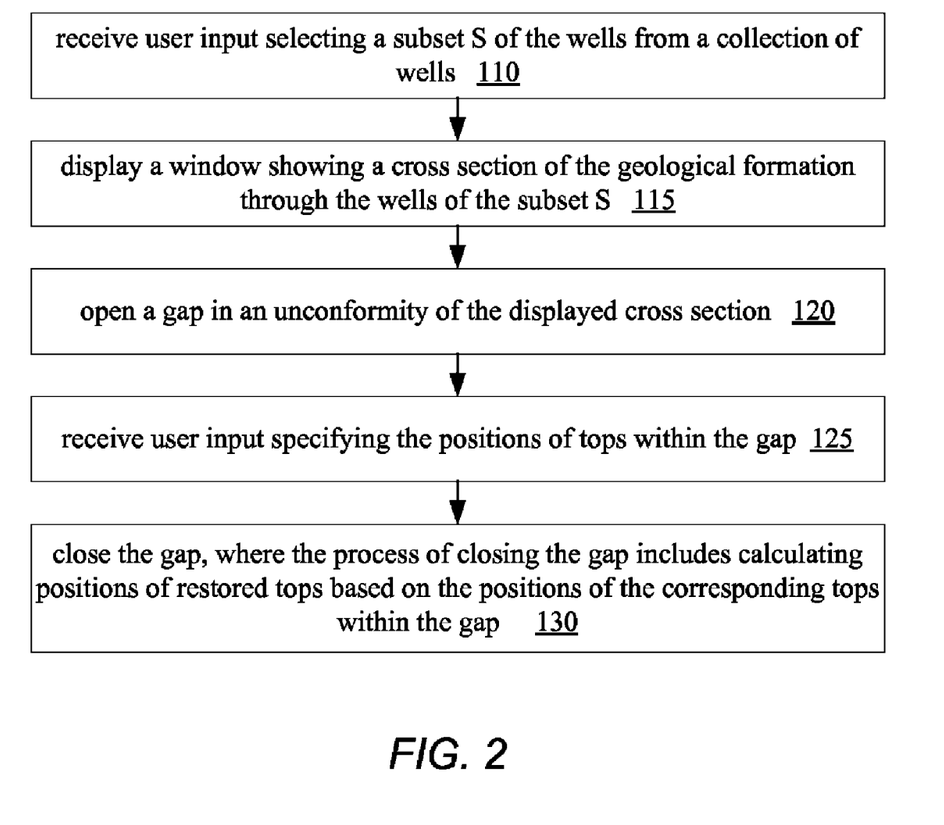
FIG. 2 illustrates one embodiment of a method for operating on a geological data set to improved the quality of that data set for the sake of surface modeling.

In one set of embodiments, a computer-implemented method for operating on a geological data set, that includes well picks for a collection C of wells in a geological formation, may involve the following operations, as illustrated in FIG. 2.

Figure 3A:
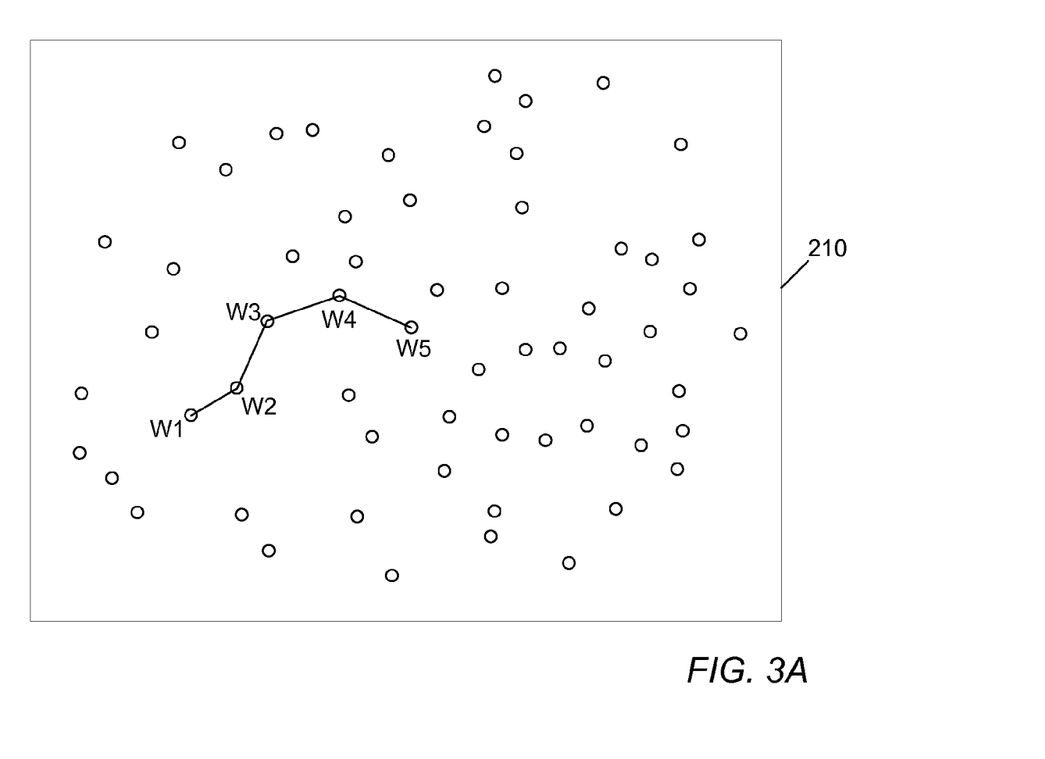
FIG. 3A illustrates one embodiment of a window displaying a collection of wells in a field and a displaying a selected subset of those wells to be analyzed.

At step 110, a computer may receive user input selecting a subset S of the wells from the collection C. To facilitate selection of the subset S, the computer may display a window 210 containing a two-dimensional plot of well positions in a field, as illustrated in FIG. 3A. (The window illustrates well positions as seen looking down on the field.) The user may select wells by clicking on (or otherwise identifying) the positions of the wells in the window. In some embodiments, the user input specifies an ordered sequence of wells. While the example of FIG. 3A shows a sequence of five wells (W1 through W5) that have been selected by a user, any number of wells may be selected.

Figure 3B:
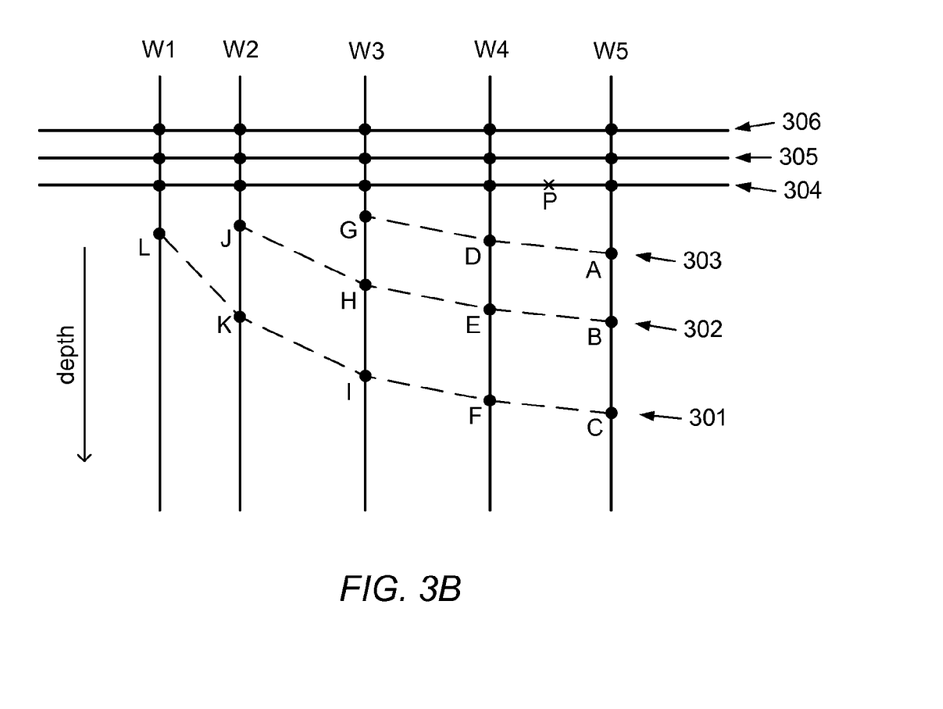
FIG. 3B illustrates displayed cross section through the wells of the selected subset.

At step 115, the computer may display a window showing a cross section of the geological formation through the wells of the subset S, as suggested in FIG. 3B. The displayed cross section includes a visual representation of the well picks for the wells of subset S. (In FIG. 3B, the well picks are represented by round dots.) A "well pick" is an estimate of a point along a well trajectory where one layer transitions into another layer.

FIG. 3B illustrates boundaries 301-306 which are boundaries between layers. Well picks A, D and G correspond to boundary 303. Well picks B, E, H and J correspond to boundary 302. Well picks C, F, I, K and L correspond to boundary 301.

Figure 5:
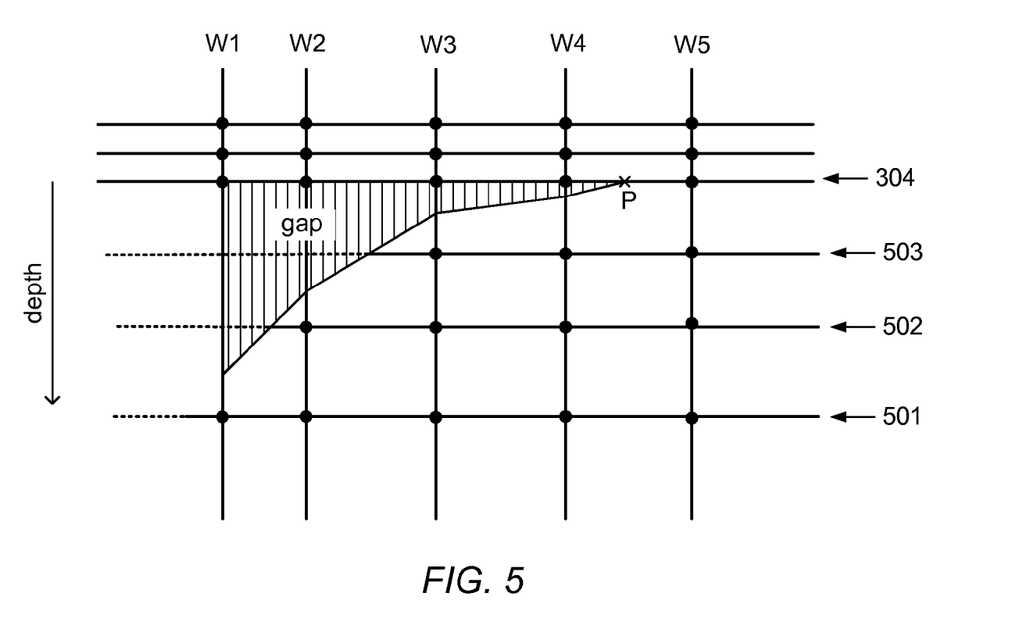
FIG. 5 illustrates a gapped representation of the cross section, where gap region corresponds to material that has eroded away from the formation.

One or more unconformities may be present in the displayed cross section. FIG. 5 shows one unconformity starting approximately at point P and extending to the left along boundary 304. (FIG. 5 also shows boundaries 501, 502 and 503.) An unconformity is an interface between layers that represents a discontinuity in geological time.

Figure 4:
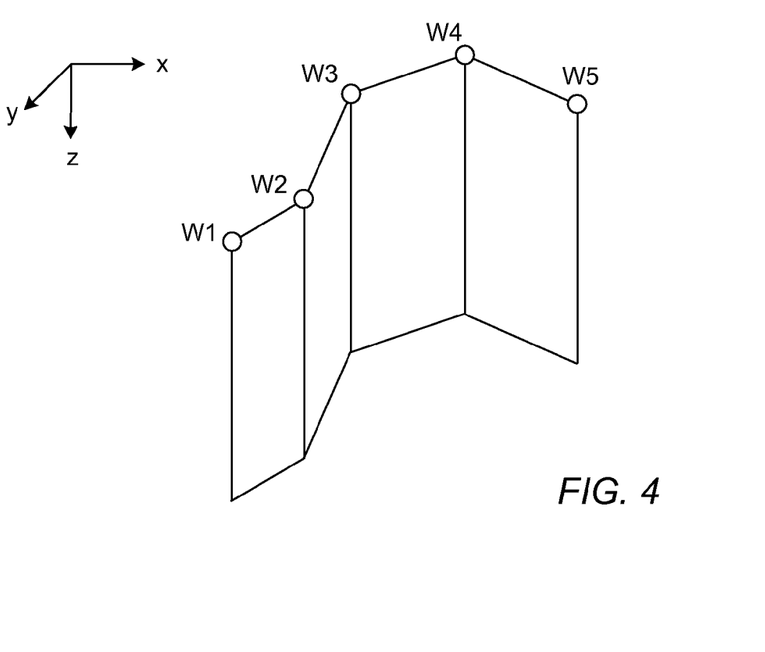
FIG. 4 illustrates an imaginary folded plane that corresponds to the selected subset of wells.

The cross section displayed in FIG. 3B may be interpreted as a flattened-out representation of a folded plane. Imagine the folded plane as cutting vertically into the earth and being folded at the well locations of the subset. FIG. 4 illustrates the folded plane for the subset of five wells given in FIG. 3A.

At step 120, the computer may open a gap in an unconformity of the displayed cross section. The gap is opened at one or more wells of the subset S that intersect the unconformity. The gap may represent non-deposition and/or material that is missing from the geological formation due to erosion.

Figure 6A:
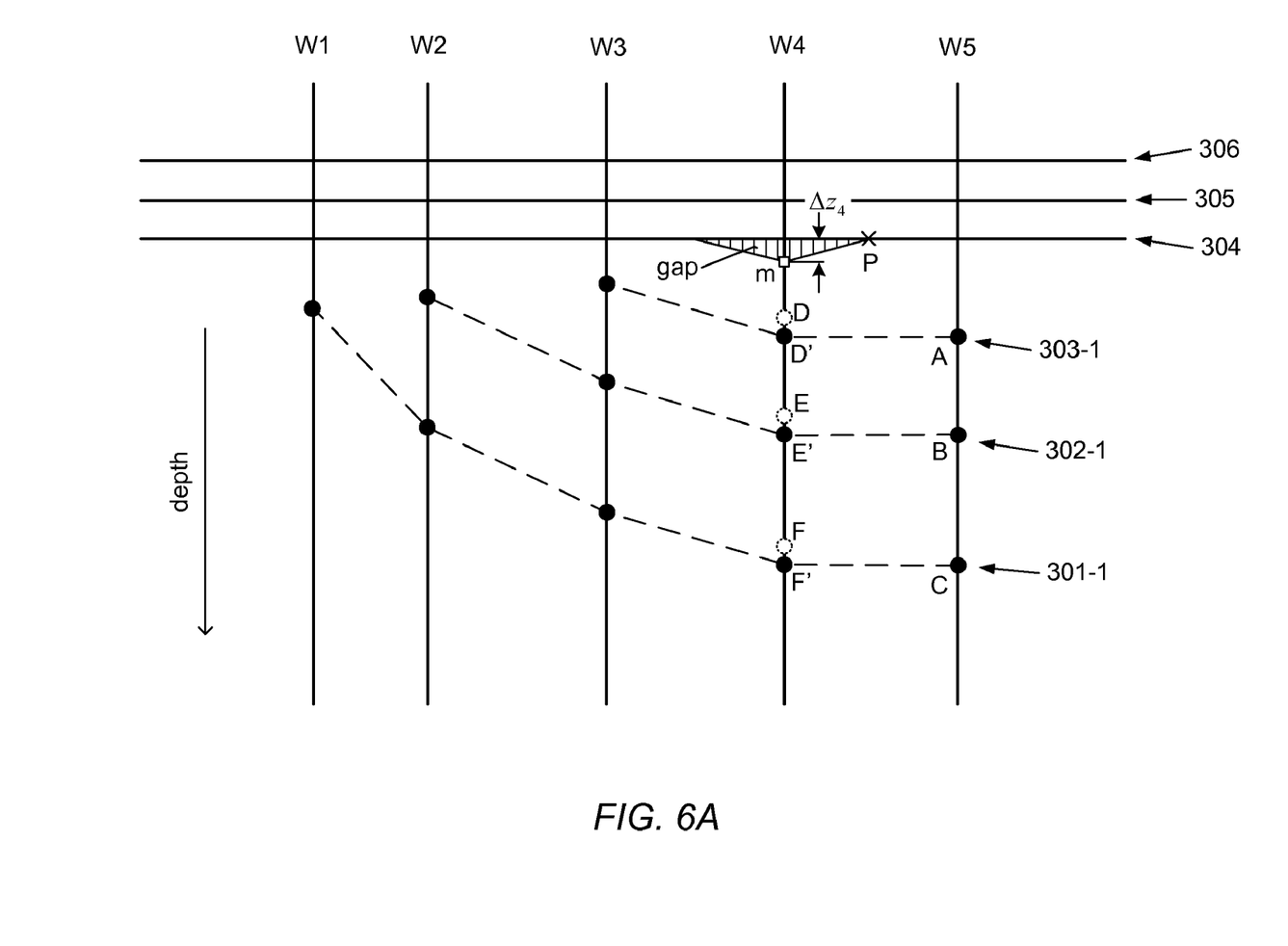
FIGS. 6A through 6D represent successive stages in the process of opening the gap in the displayed cross section.

The gap may be opened in stages, e.g., one well at a time as suggested in FIGS. 6A-6D. FIG. 6A shows a first stage in which the gap is initially opened along well W4. The state of the boundaries 301, 302 and 303 after this first stage are shown at 301-1, 302-1 and 303-1. (Any of the wells that intersect the unconformity could have been used to open the gap. Well W4 is chosen here merely for the sake of discussion.) The gap is opened up in the downward direction by an amount $\Delta z_4$ specified by the user. The gap is illustrated in cross-hatch. As the gap is opened, each of the well picks along well W4 and below the unconformity is translated vertically downward by the same amount $\Delta z_4$. The well picks originally at positions D, E and F are translated respectively to positions D', E' and F'. In one embodiment, the user specifies the amount $\Delta z_4$ by dragging on a marker m (denoted with a small square icon) that indicates the bottom edge of the gap. FIG. 6A illustrates the situation where the user has selected amount $\Delta z_4$ so that the translated positions D', E' and F' line up at the same depths as the corresponding well picks on well W5, i.e., with well picks A, B and C. In general, this condition of alignment of well picks of one well with those of another may not be achievable since a given layer may not have a uniform thickness (in the depth dimension) at each of the wells.

Figure 6B:
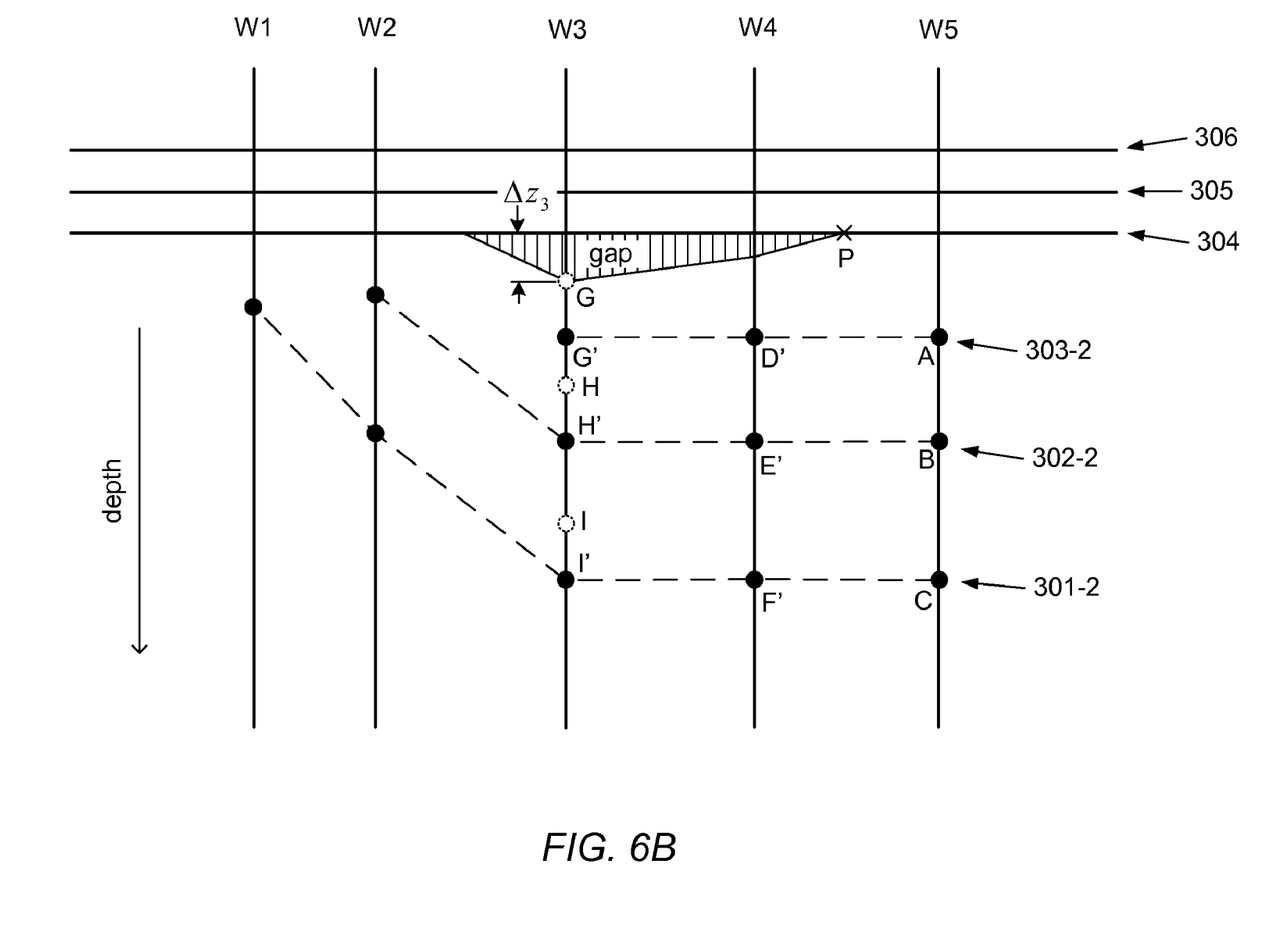

FIG. 6B illustrates a second stage in which the gap is extended to including an opening along well W3. (The state of the boundaries 301, 302 and 303 after this second stage are shown at 301-2, 302-2 and 303-2.) The user specifies an amount $\Delta z_3$ by which the gap is be opened. As the gap is opened, each of the well picks along well W3 and below the unconformity is translated downward by the same amount $\Delta z_3$. The well picks originally at positions G, H and I are translated respectively to positions G', H' and I'. The user may specify the amount $\Delta z_3$ by dragging on a marker (not shown) that indicates the bottom edge of the gap (i.e., that portion of the gap being opened up along well W3).

Figure 6C:
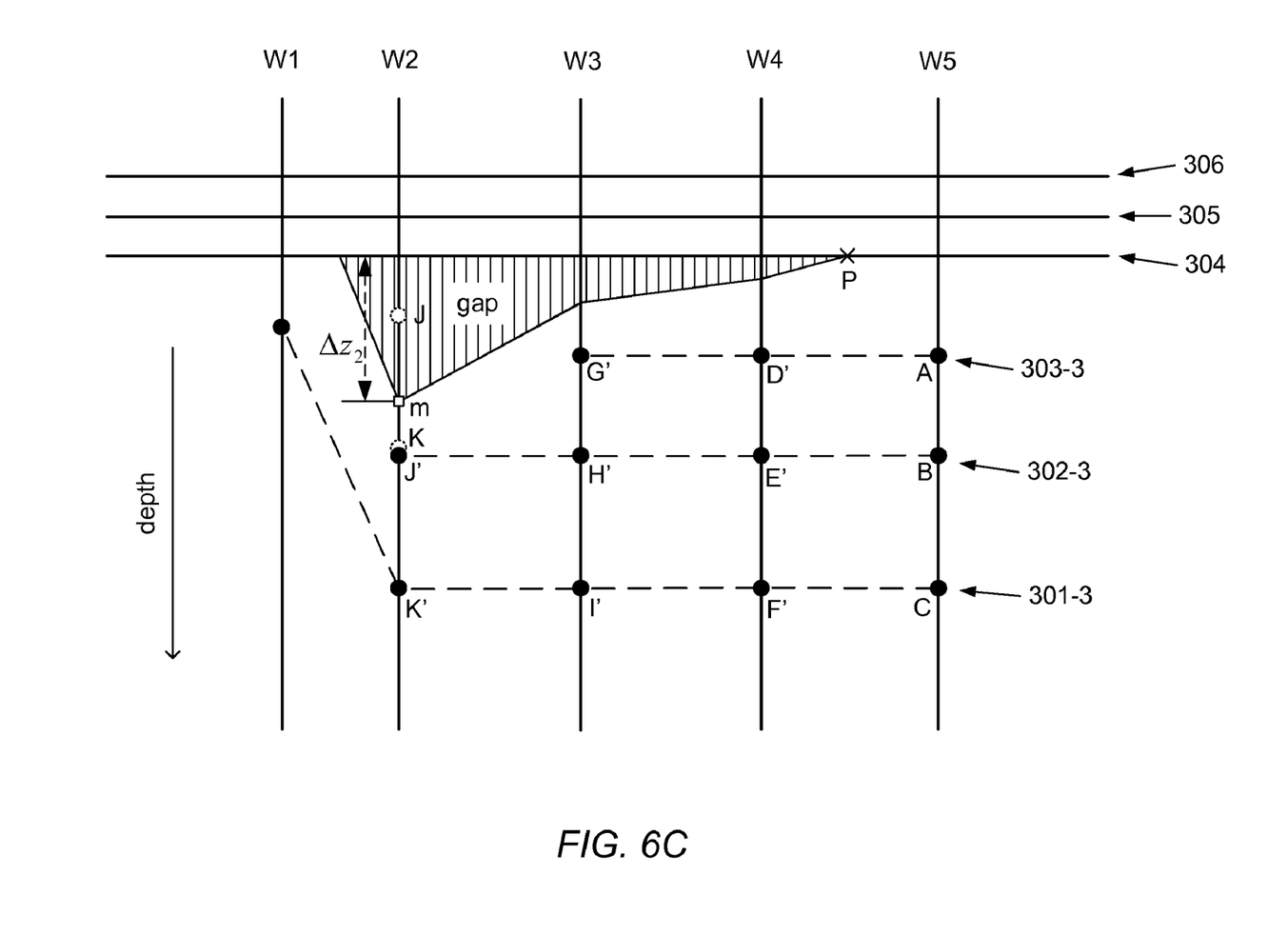

FIG. 6C illustrates a third stage in which the gap is extended to including an opening along well W2. (The state of the boundaries 301, 302 and 303 after this third stage are shown at 301-3, 302-3 and 303-3.) The user specifies an amount $\Delta z_2$ by which the gap is be opened. As the gap is opened, each of the well picks along well W2 and below the unconformity is translated downward by the same amount $\Delta z_2$. The well picks originally at positions J and K are translated respectively to positions J' and K'. The user may specify the amount $\Delta z_2$ by dragging on a marker m (denoted with a small square icon) that indicates the bottom edge of the gap (i.e., that portion of the gap being opened up along well W2).

Figure 6D:
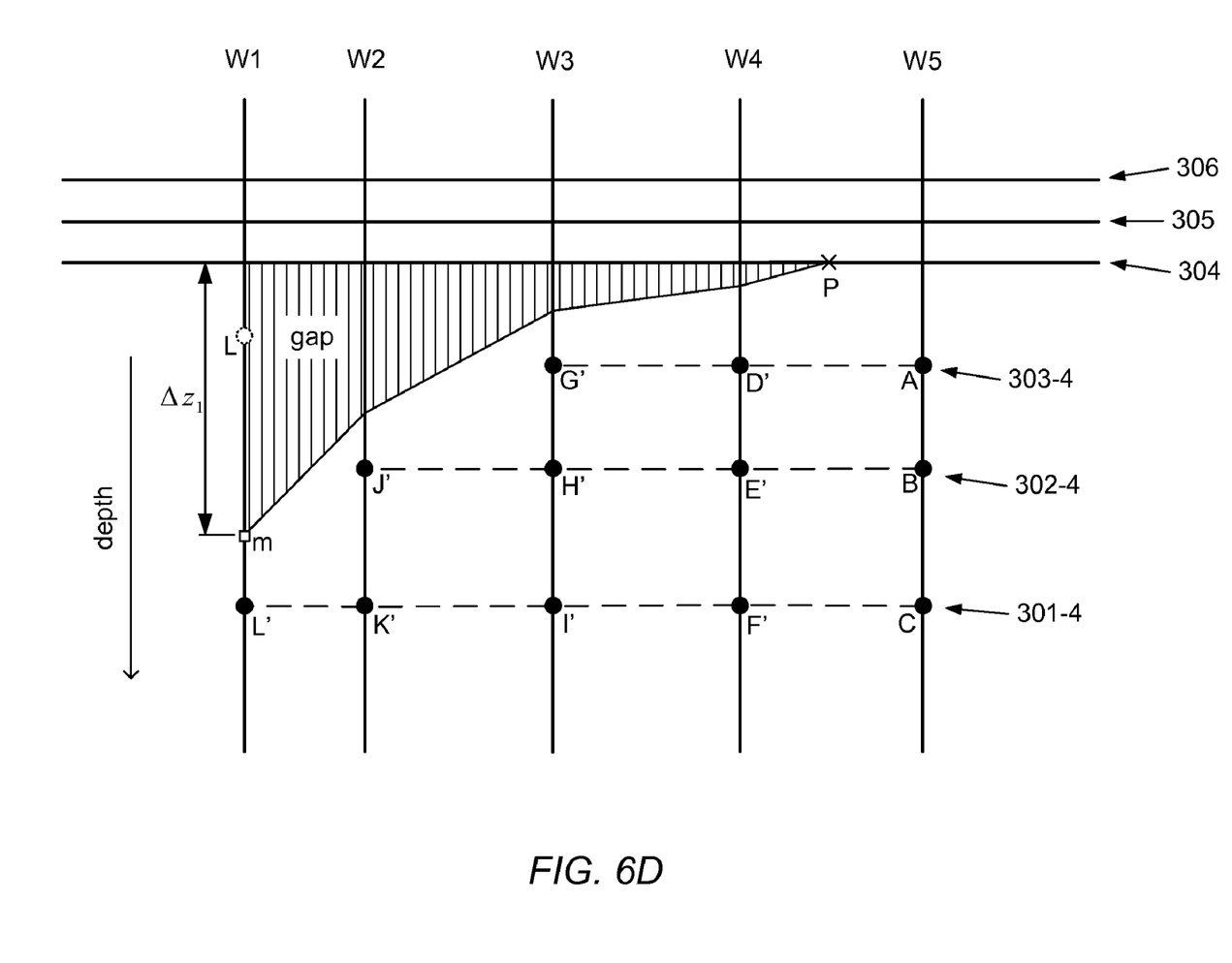

FIG. 6D illustrates a fourth stage in which the gap is extended to including an opening along well W1. The user specifies an amount $\Delta z_1$ by which the gap is be opened. As the gap is opened, each of the well picks along well W1 and below the unconformity is translated downward by the same amount $\Delta z_1$. Thus, the well pick originally at position L is translated to position L'. The user may specify the amount $\Delta z_1$ by dragging on a marker m (denoted with a small square icon) that indicates the bottom edge of the gap (i.e., that portion of the gap being opened up along well W1).

FIG. 6D shows each of the modified boundaries 301-4, 302-4 and 303-4 as being a locus of constant depth. A diagram is said to be pseudo-Wheeler diagram when this condition is achieved for all the boundaries between layers in a diagram. (Such a diagram is said to have been transformed to "pseudo Wheeler space".) As discussed above, this condition is not achievable in general because layers generally vary in thickness from one well to the next. However, it is noted that the embodiments disclosed herein do not require that this condition be achieved.

Figure 7:
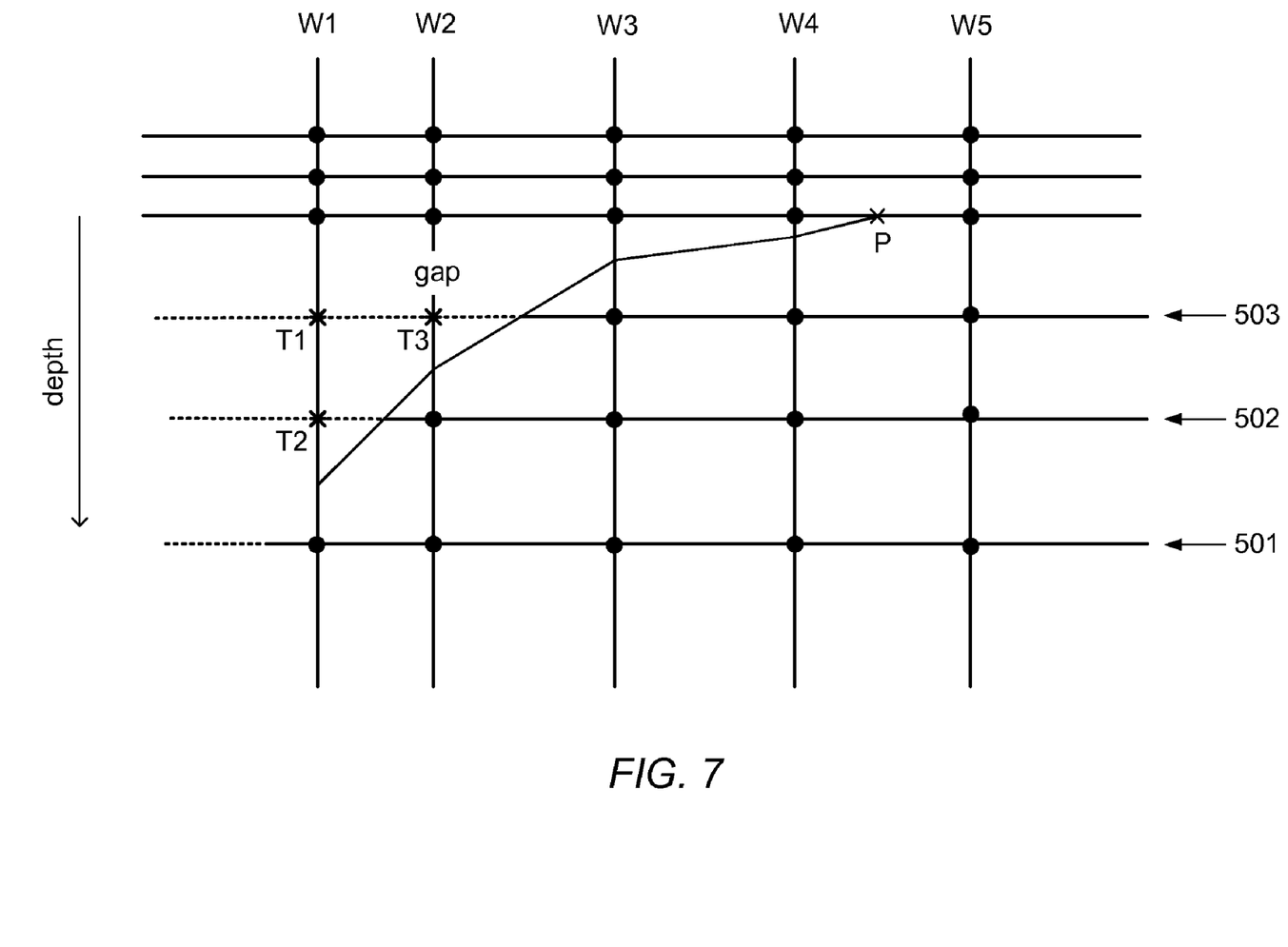
FIG. 7 illustrates the injection of user specified tops into the gap region.

After the gap has been opened as described above, step 125 may be performed. In step 125, the computer may receive user input specifying the positions of tops within the gap, e.g., as suggested by the tops T1-T3 (denoted by small "x" symbols) in FIG. 7. The position for each of the tops is specified on one of the wells. Tops T1 and T2 have been specified along well W1, and top T3 has been specified on well W2. Furthermore, each of the tops is specified at a position that is consistent with one of the boundaries in the displayed diagram. For example, tops T1 and T3 are specified at positions that are consistent with boundary 503, and top T2 is specified at a position that is consistent with boundary 502. The fact that the boundaries 502 and 503 have been flattened into loci of constant depth (in the illustrated example) by the gap-opening process of step 120 makes it easy for a user to estimate appropriate locations for the tops T1-T3. However, it should be noted that this benefit of ease (of top position estimation) is significantly conveyed even when the flattening of boundaries is only partial or incomplete. For example, significant benefits may be conveyed even when one or more boundaries merely experience a decrease in local curvature.

Figure 8:
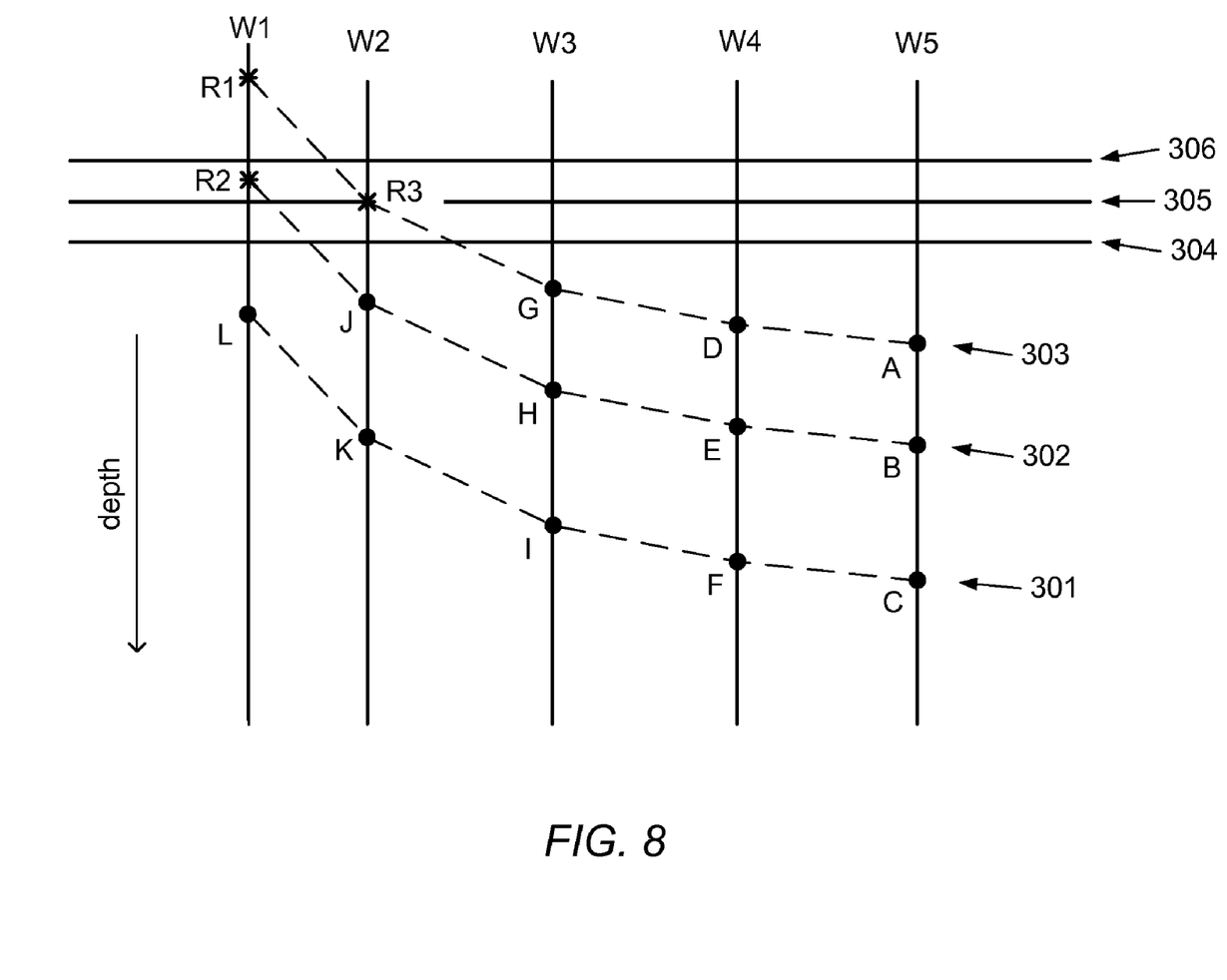
FIG. 8 illustrates the cross section with restored tops, after the gap has been closed.

In step 130, the computer may close the gap, e.g., as suggested in FIG. 8. The action of closing the gap includes calculating positions of restored tops based on the positions of the corresponding tops within the gap. FIG. 8 illustrates restored tops R1, R2 and R3 which correspond to tops T1, T2 and T3 respectively. The depth $z_{RT}$ of a given restored top along a well Wk (where Wk is one of the wells that have experience the gap-opening process of step 120) may be computed according to the expression $z_{RT}=z_T-\Delta z_k$, where $z_T$ is the depth of the top as specified by the user in the "gapped representation" (i.e., FIG. 7), and where $\Delta z_k$ is the amount by which the gap was opened at well Wk. (The program executing on the computer is configured to store the amount $\Delta z_k$ by which the gap is opened along any given well Wk during step 120.)

The positions of the restored tops may be used to improve the modeling of surfaces in the geological formation. For example, the positions of restored tops R1 and R3 may be added to a data set including well picks A, D and G to improve the modeling of boundary 303 (or, the modeling of a surface of which boundary 303 is portion) in the geological formation. Similarly, restored top position R2 may be added to a data set including well picks B, E, H and J to improve the modeling of boundary 302.

It is noted that the displayed cross section may include more than one unconformity. Thus, steps 120 and 125 may be repeated for one or more additional unconformities in the displayed cross section.

Figure 9:
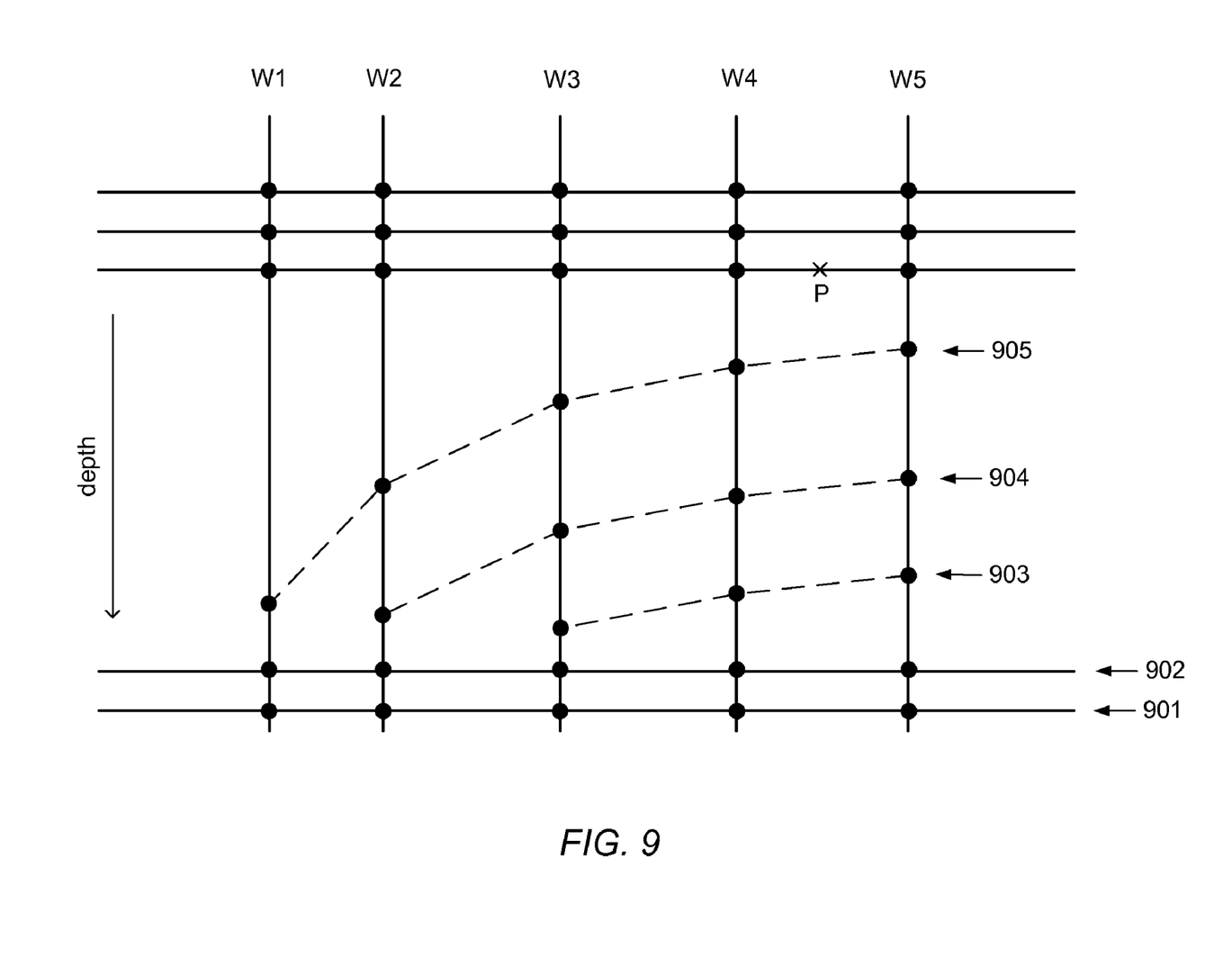
FIG. 9 illustrates a set of layers being bounded by an unconformity from below.

FIG. 3B illustrates the situation where a number of layers (e.g., the layers between boundaries 301-303) meet an unconformity from below. The unconformity bounds those layers from above. Thus, the gap is opened up by translating well picks underneath the unconformity in a downward direction (i.e., the direction of increasing depth). However, other kinds of unconformities may be handled by the computational methods described herein. For example, an unconformity may bound a set of layers from below as suggested in FIG. 9. (FIG. 9 shows boundaries 901, 902, 903, 904 and 905.) In this case, the gap would be opened up by translating well picks above the unconformity in the upward direction (i.e., the direction of decreasing depth).

FIG. 2 is described in terms a single set of wells. However, the steps of FIG. 2 may be repeated for any number of well subsets.

The restored tops generated by the above-described method may be used to augment the well pick positions of wells in collection C. The augmented data set may be supplied to a surface modeling routine. The surface modeling routine can do a better job at generating models that accurately estimate the surfaces in the formation. Any of various known surface modeling routines are contemplated for use in generating the surface models.

The surface models may be used to estimate a location of a substance in the geological formation using the one or more surface models, e.g., a substance such as oil, gas, tar sand, coal, any of various minerals, etc. The estimated location may be used to control the drilling of a well, e.g., to determine a surface location to initiate drilling of the well or to determine the well plan of the well. Furthermore, the estimated location may be used to control the acquisition of seismic data, to determine placement of geophones and sensors, etc.

The computer may be configured (with appropriate software) to display a visual representation of the geological formation including a visual depiction of one or more of the surface models.

In one embodiment, the method embodiment of FIG. 2 is implemented as an extension to SmartSECTION®, a software product available from Halliburton Energy Services.

Figure 10:
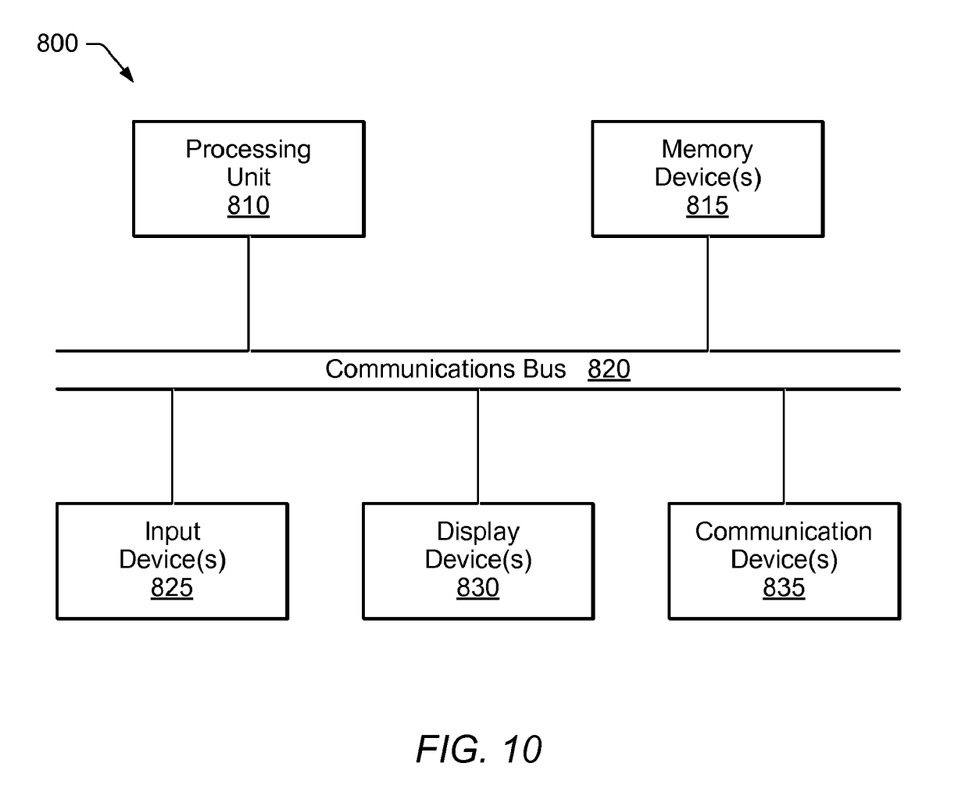
FIG. 10 illustrates one embodiment of a computer system suitable for execution of any or all of the methods described herein.

FIG. 10 illustrates one embodiment of a computer system 800. Computer system 800 may include a processing unit 810, a collection of memory devices 815, a communication bus 820, a set of input devices 825, and one or more display devices 830. The collection of memory devices 815 may include any of various forms of memory media and memory access devices. For example, memory devices 815 may include semiconductor RAM and ROM devices as well as mass storage devices such as CD-ROM drives, magnetic disk drives, magnetic tape drives, storage area networks (SANs), etc.

Processing unit 810 is configured to read and execute program instructions, e.g., program instructions stored on a memory medium such as a set of one or more CD-ROMs, and loaded into semiconductor memory at execution time. Processing unit 810 may couple to memory devices 815 through communication bus 820 (or through a collection of busses). The program instructions configure the computer system 800 to implement a method, e.g., any of the method embodiments described herein (or any combination of the methods described herein or any subset of any method described herein).

Processing unit 810 may include one or more programmable processors (e.g., microprocessors).

One or more users may supply input to the system 800 through the set of input devices 825. Input devices 825 may include devices such as keyboards, mouse devices, digitizing pads, track balls, light pens, data gloves, eye orientation sensors, head orientation sensors, etc. The set of display devices 830 may include devices such as monitors, projectors, head-mounted displays, printers, plotters, etc.

In one embodiment, system 800 may include one or more communication devices 835, e.g., a network interface card for interfacing with a computer network. For example, a collection of surface sample points obtained at a remote computer may be transmitted to the system 800 through a computer network. The system 800 may receive the collection of surface sample points from the computer network using the network interface card. In other embodiments, the system 800 may include a plurality of computers and/or other components coupled over the computer network.

Although the system and method of the present invention has been described in connection with the preferred embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A computer-readable memory medium storing program instructions for operating on a geological data set that includes well picks for a number of wells in a geological formation, wherein the program instructions are computer-executable to implement:
    (a) receiving a first user input selecting a subset of the wells;
    (b) displaying a cross section of the geological formation through the wells of said subset, wherein the displayed cross section includes well picks for the wells of said subset;
    (c) opening a gap in an unconformity of the displayed cross section, wherein the gap is opened at one or more wells of said subset that intersect the unconformity, wherein the gap represents non-deposition and/or material that is missing from the geological formation due to erosion, wherein said opening the gap in the unconformity includes: (c1) receiving a second user input selecting a first well that intersects the unconformity; (c2) translating one or more well picks that correspond to the selected well and that reside below the unconformity, wherein said translating moves the one or more well picks vertically downward in the displayed cross section by an amount that is determined by a third user input;
    (d) receiving a fourth user input specifying positions of tops within the gap; and
    (e) closing the gap, wherein said closing the gap includes calculating positions of restored tops based on the positions of the tops within the gap, wherein the positions of the restored tops are usable to model one or more surfaces in the geological formation.

2. The memory medium of claim 1, wherein the program instructions are computer executable to implement:
    performing (c1) and (c2) for one or more additional wells that intersect the unconformity.

3. The memory medium of claim 1, wherein the geological formation includes a number of rock layers, wherein the well picks of said number of wells represent samples of position on surfaces between the rock layers, wherein said opening of the gap achieves a transformation of the displayed cross section to pseudo-Wheeler space.

4. The memory medium of claim 1, wherein the program instructions are computer executable to implement:
    repeating (a) through (e) for a different subset of the wells.

5. The memory medium of claim 1, wherein the program instructions are computer executable to implement:
    repeating (c) for another unconformity in the displayed cross section.

6. The memory medium of claim 1, wherein the geological formation includes a number of rock layers, wherein the well picks of said number of wells represent samples of position on surfaces between the rock layers, the method further comprising:
    operating on the well picks of the number of wells and on the positions of the restored tops to determine one or more surface models for one or more of the surfaces, respectively.

7. The memory medium of claim 6, wherein the program instructions are computer-executable to implement:
    estimating a location of a substance in the geological formation using the one or more surface models.

8. The memory medium of claim 6, wherein the program instructions are computer-executable to implement:
    displaying a visual representation of the geological formation including a representation of the one or more surface models.

9. The memory medium of claim 7, wherein the program instructions are computer-executable to implement:
    using the estimated location to control a drilling of a well.

10. The memory medium of claim 7, wherein the program instructions are computer-executable to implement:
using the estimated location to determine a surface location for drilling a well.

11. The memory medium of claim 1, wherein the program instructions are computer-executable to implement:
storing the positions of the restored tops in a memory medium.

12. A computer-implemented method for operating on a geological data set that includes well picks for a number of wells in a geological formation, the method comprising:
(a) receiving first user input selecting a subset of the wells;
(b) displaying a cross section of the geological formation through the wells of said subset, wherein the displayed cross section includes well picks for the wells of said subset;
(c) opening a gap in an unconformity of the displayed cross section, wherein the gap is opened at one or more wells of said subset that intersect the unconformity, wherein the gap represents non-deposition and/or material that is missing from the geological formation due to erosion;
(d) receiving second user input specifying positions of tops within the gap; and
(e) closing the gap, wherein said closing the gap includes calculating positions of restored tops based on the positions of the tops within the gap, wherein the positions of the restored tops are usable to model one or more surfaces in the geological formation, wherein the geological formation includes a number of rock layers, wherein the well picks of said number of wells represent samples of position on surfaces between the rock layers, wherein, after said opening of the gap, the well picks corresponding to each of the surfaces are aligned horizontally.

13. The method of claim 12, wherein the geological formation includes a number of rock layers, wherein the well picks of said number of wells represent samples of position on surfaces between the rock layers, wherein said opening of the gap achieves a transformation of the displayed cross section to pseudo-Wheeler space.

14. The method of claim 12, further comprising:
repeating (a) through (e) for a different subset of the wells.

15. The method of claim 12, further comprising:
repeating (c) for another unconformity in the displayed cross section.

16. The method of claim 12, wherein the geological formation includes a number of rock layers, wherein the well picks of said number of wells represent samples of position on surfaces between the rock layers, the method further comprising:
operating on the well picks of the number of wells and on the positions of the restored tops to determine one or more surface models for one or more of the surfaces, respectively.

17. The method of claim 12, further comprising:
estimating a location of a substance in the geological formation using the one or more surface models.

18. A computer system for operating on a geological data set that includes well picks for a number of wells in a geological formation, the computer system comprising:
a processor; and
a memory storing program instructions, wherein the program instructions are executable by the processor to:
(a) receive first user input selecting a subset of the wells;
(b) display a cross section of the geological formation through the wells of said subset, wherein the displayed cross section includes well picks for the wells of said subset;
(c) open a gap in an unconformity of the displayed cross section, wherein the gap is opened at one or more wells of said subset that intersect the unconformity, wherein the gap represents non-deposition and/or material that is missing from the geological formation due to erosion;
(d) receive second user input specifying positions of tops within the gap; and
(e) close the gap, wherein said closing the gap includes calculating positions of restored tops based on the positions of the tops within the gap, wherein the positions of the restored tops are usable to model one or more surfaces in the geological formation, wherein the geological formation includes a number of rock layers, wherein the well picks of said number of wells represent samples of position on surfaces between the rock layers, wherein, after said opening of the gap, the well picks corresponding to each of the surfaces are aligned horizontally.

19. A computer-readable memory medium storing program instructions for operating on a geological data set that includes well picks for a number of wells in a geological formation, wherein the program instructions are computer-executable to implement:
(a) receiving a first user input selecting a subset of the wells;
(b) displaying a cross section of the geological formation through the wells of said subset, wherein the displayed cross section includes well picks for the wells of said subset;
(c) opening a gap in an unconformity of the displayed cross section, wherein the gap is opened at one or more wells of said subset that intersect the unconformity, wherein the gap represents non-deposition and/or material that is missing from the geological formation due to erosion, wherein said opening the gap in the unconformity includes: (c1) receiving a second user input selecting a first well that intersects the unconformity; (c2) translating one or more well picks that correspond to the selected well and that reside above the unconformity, wherein said translating moves the one or more well picks vertically upward in the displayed cross section by an amount that is determined by a third user input;
(d) receiving a fourth user input specifying positions of tops within the gap; and
(e) closing the gap, wherein said closing the gap includes calculating positions of restored tops based on the positions of the tops within the gap, wherein the positions of the restored tops are usable to model one or more surfaces in the geological formation.

20. The memory medium of claim 19, wherein the program instructions are computer executable to implement:
performing (c1) and (c2) for one or more additional wells that intersect the unconformity.

21. A computer-readable memory medium storing program instructions for operating on a geological data set that includes well picks for a number of wells in a geological formation, wherein the program instructions are computer-executable to implement:
(a) receiving first user input selecting a subset of the wells;
(b) displaying a cross section of the geological formation through the wells of said subset, wherein the displayed cross section includes well picks for the wells of said subset;
(c) opening a gap in an unconformity of the displayed cross section, wherein the gap is opened at one or more wells of said subset that intersect the unconformity, wherein the gap represents non-deposition and/or material that is missing from the geological formation due to erosion;

(d) receiving second user input specifying positions of tops within the gap; and
(e) closing the gap, wherein said closing the gap includes calculating positions of restored tops based on the positions of the tops within the gap, wherein the positions of the restored tops are usable to model one or more surfaces in the geological formation, wherein the geological formation includes a number of rock layers, wherein the well picks of said number of wells represent samples of position on surfaces between the rock layers, wherein, after said opening of the gap, the well picks corresponding to each of the surfaces are aligned horizontally.

* * * * *